United States Patent [19]
Ogawa

[11] Patent Number: 5,642,164
[45] Date of Patent: Jun. 24, 1997

[54] LIGHT SPOT POSITION MEASURING APPARATUS HAVING ORTHOGONAL CYLINDRICAL LENSES

[75] Inventor: Yasuji Ogawa, Otone-machi, Japan

[73] Assignee: Kabushikikaisha Wacom, Japan

[21] Appl. No.: 391,128

[22] Filed: Feb. 21, 1995

[30] Foreign Application Priority Data

Feb. 22, 1994 [JP] Japan ................... 6-049900

[51] Int. Cl.⁶ .................................................. G01B 11/00
[52] U.S. Cl. .............................................. 348/335; 356/401
[58] Field of Search ................................. 348/335, 207; 356/400, 401, 375

[56] References Cited

U.S. PATENT DOCUMENTS

| | | | |
|---|---|---|---|
| 4,636,080 | 1/1987 | Feldman | 356/401 |
| 4,830,485 | 5/1989 | Penney et al. | 356/1 |
| 4,973,152 | 11/1990 | Brunk | 356/1 |
| 5,335,058 | 8/1994 | Eiju et al. | 356/28.5 |

FOREIGN PATENT DOCUMENTS

| | | | |
|---|---|---|---|
| 3412075 | 3/1984 | Germany | G01B 11/03 |
| 6095308 | 5/1985 | Japan | G01B 11/00 |
| 331362 | 5/1991 | Japan. | |

*Primary Examiner*—Wendy Garber
*Attorney, Agent, or Firm*—Adams & Wilks

[57] ABSTRACT

A light spot position measuring apparatus includes a television camera for capturing an image of an object to be measured and an image processing unit. At least two cylindrical lens surfaces are provided in addition to an objective lens of the television camera so as to convert a light spot included in the object to be measured into linear images intersecting each other. The linear images are projected onto an image pickup face of the television camera which produces a corresponding image data. The image processing unit, processes the image data to extract corresponding straight lines. The unit further derives an intersection point of the straight lines and determines a position of the light spot in terms of the derived intersection point. The cylindrical lens surfaces have their cylinder axes which intersect each other. When a pair of the cylindrical lens surfaces having their cylinder axes intersecting orthogonal to each other are provided, a cross-shaped linear image is obtained. The cylindrical lens surfaces may be formed on a single lens or on separate lenses, respectively.

14 Claims, 8 Drawing Sheets

Grinding surface
Rotary drum
Optical glass plate

Grinding surface
Rotary drum
Optical glass plate

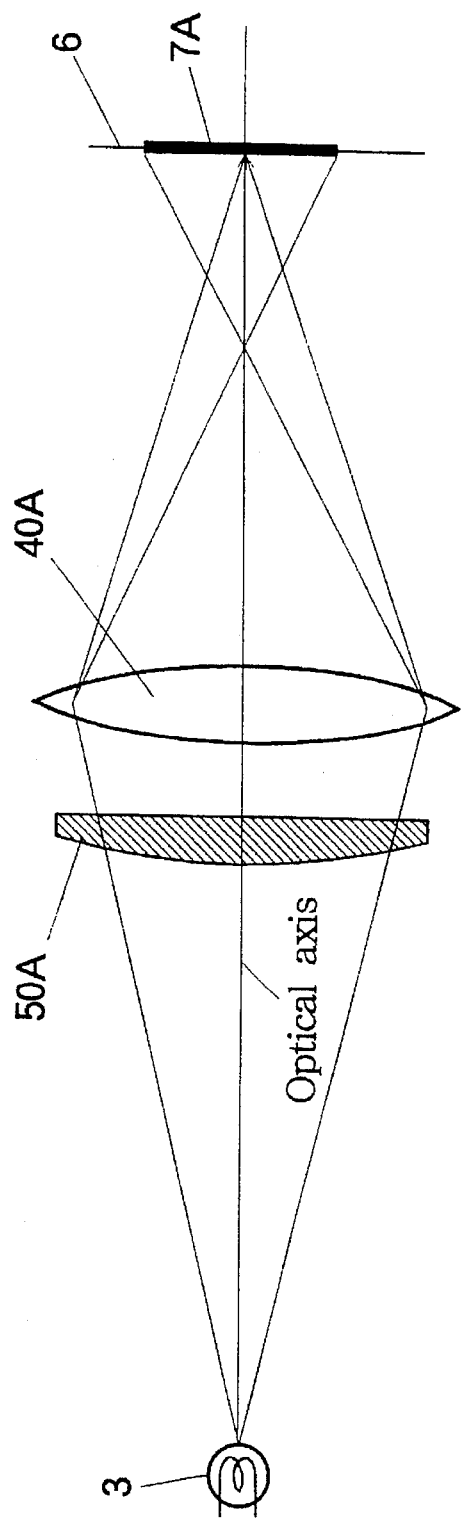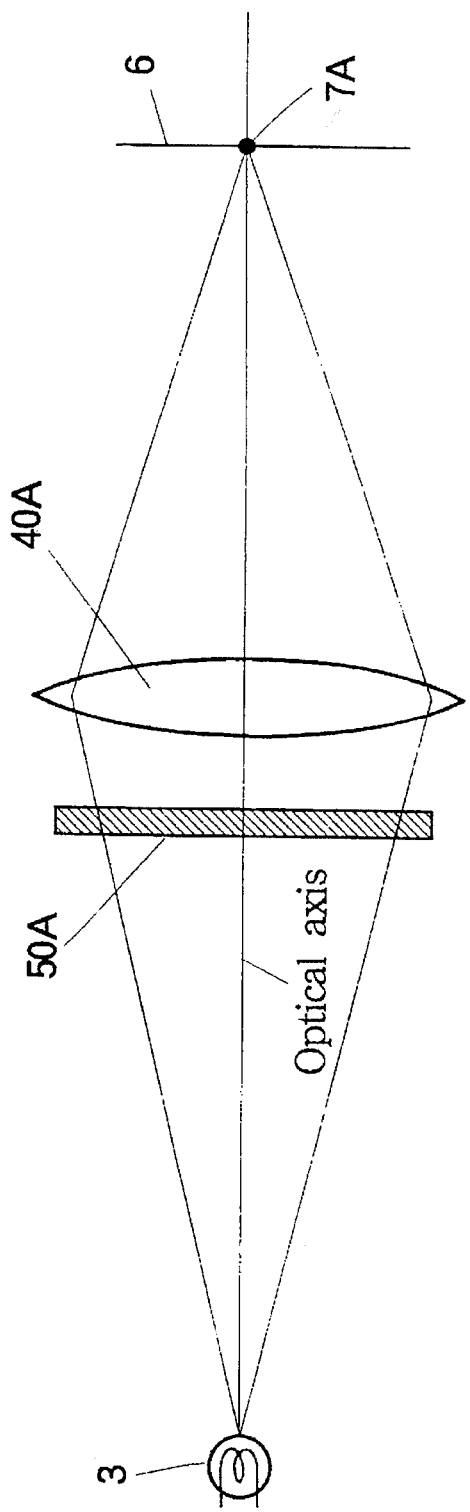

LIGHT SPOT POSITION MEASURING APPARATUS HAVING ORTHOGONAL CYLINDRICAL LENSES

BACKGROUND OF THE INVENTION

1. Field of the Invention

The present invention relates to a light spot position measuring apparatus and a light spot position measuring method, wherein a position or positions of a point light source or point light sources which directly or indirectly emits/emit a light is/are measured using an image pickup device. More specifically, the present invention relates to a technique for measuring the position or positions of the point light source or sources with improved accuracy.

2. Description of the Prior Art

Conventionally, when, for example, measuring a surface configuration of a three-dimensional object, the so-called stereo method has been available, wherein the three-dimensional object to be measured is scanned by a laser beam emitted from a scanning laser projector, and two television cameras are used to capture images of laser-beam spots produced on the three-dimensional object in sequence. Image signals outputted from the television cameras are processed so as to derive three-dimensional positions (coordinates) of the respective laser-beam spots. By synchronously performing the scanning of the three-dimensional object by the laser beam along the surface thereof and the measurement of the three-dimensional coordinates of the respective laserbeam spots in sequence, the surface configuration of the three-dimensional object is measured.

For enhancing the measurement accuracy in the foregoing measuring system, it is necessary to improve the resolution of the television cameras. For the improvement thereof, the number of picture elements (pixels) in the image pickup device such as a CCD image sensor incorporated in the television camera should be greatly increased, which, however, is difficult in view of manufacturing technique.

Technique has been proposed as disclosed in, such as, Japanese Second (examined) Patent Publication No. 3-31362, for improving an apparent or effective resolution of the television camera without increasing the number of the pixels of the image pickup device. According to this technique, a cross filter is mounted to an objective lens of the television camera so as to convert light beams from targets in the form of point light sources (light spots) into cross-shaped streak images through the cross filter. The cross-shaped streak images are projected onto a light-receiving area of the image pickup device. The projected images are processed to derive an intersection point of each cross-shaped streak image for determining a corresponding light spot position, that is, a position of the corresponding point light source forming the target.

However, the foregoing conventional technique has a drawback in that the light source to be used should be capable of emitting a light with a high intensity for enhancing accuracy in detection of the light spot position. Specifically, in the foregoing cross-shaped streak image, roam energy or power of the light is concentrated to the center of the image so that the remaining energy of the light dispersed around a periphery of the image is inevitably small. This means that the light power is not utilized efficiently. As a result, in order to raise the position detection accuracy, the intensity of the light emitted from the light source should be increased. In other words, when an intensity of the light from the light source is lower than a certain level, the cross-shaped streak image is not clearly projected onto the image pickup device, resulting in a problem of poor sensitivity.

Accordingly, when such a conventional technique is applied to the foregoing measurement of the surface configuration of the three-dimensional object or the like, due to limitation of a distance between the television camera and the object and a reflectance on the surface of the object or the like, the application field is inevitably restricted so that, for example, the application to the survey in the civil engineering field or the like is difficult.

SUMMARY OF THE INVENTION

In view of the foregoing problem in the conventional technique, it is an object of the present invention to enable a position measurement with high accuracy even with a light spot which emits weak light.

As a basic structure, a light spot position measuring apparatus according to the present invention includes optical conversion means, image pickup means and image processing means. The optical conversion means collects and condenses a light emitted from a light spot included in an object to be measured, so as to convert the light into a plurality of linear images intersecting each other. The image pickup means receives the linear images and outputs a corresponding image data. The image processing means processes the image data and derives a plurality of corresponding straight lines from the linear images. The image processing means further computes and derives an intersection point of the straight lines so as to determine a position of the light spot. The light spot position measuring apparatus according to the present invention is characterized in that the optical conversion means has a plurality of cylindrical lens surfaces with their cylinder axes intersecting each other, so as to form the foregoing linear images. For example, the optical conversion means has a pair of the cylindrical lens surfaces with their cylinder axes intersecting orthogonal to each other so as to form cross-shaped linear images. The cylindrical lens surfaces are formed on a single lens, and each of the cylindrical lens surfaces is divided in symmetry with respect to an optical axis of the lens.

A light spot position measuring method according to the present invention includes a conversion step, an image pickup step and a deriving step. At the conversion step, by using optical conversion means having a plurality of cylindrical lens surfaces with their cylinder axes intersecting each other, a light emitted from a light spot included in an object to be measured is condensed and converted into a plurality of linear images intersecting each other. Subsequently, at the image pickup step, by using image pickup means, the linear images are received and a corresponding image data are outputted. Finally, at the deriving step, by using image processing means, the image data is processed to derive a plurality of straight lines, and further, an intersection point of the straight lines is derived so as to determine a position of the light spot.

According to the present invention, for example, a lens having a pair of cylindrical lens surfaces with their cylinder axes intersecting orthogonal to each other is added to an objective lens of a television camera or used as an objective lens itself to form the optical conversion means. With this arrangement, a light emitted from a light spot can be converted into linear images intersecting orthogonal to each other, that is, converted into a cross-shaped linear image. As opposed to the conversion effected by the conventional cross filter, in the conversion effected by the orthogonal cylindrical lens surfaces, a power of the light from the light spot can be uniformly dispersed to form the cross-shaped linear image having a sharp profile. By processing the cross-shaped linear image having brightness of a sufficient level and the sharp profile, an intersection point of orthogonal straight lines can be derived with high accuracy. Accordingly, even if the light emitted from the light spot is weak, since the light is efficiently utilized, the light spot position can be reliably measured with high accuracy. This makes it possible that, in the measuring system of, such as, the surface configuration of the three-dimensional object where the object is spot-scanned by the laser beam, an allowable measurement distance can extended and a lack in sensitivity caused by fast laserbeam scanning can be compensated.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIGS. 12A and 12B are diagrams, respectively, for explaining an operation of a cylindrical convex lens and an objective lens shown in FIG. 11.

DESCRIPTION OF THE PREFERRED EMBODIMENTS

Now, preferred embodiments of the present invention will be described in detail hereinbelow with reference to the accompanying drawings.

Figure 1:
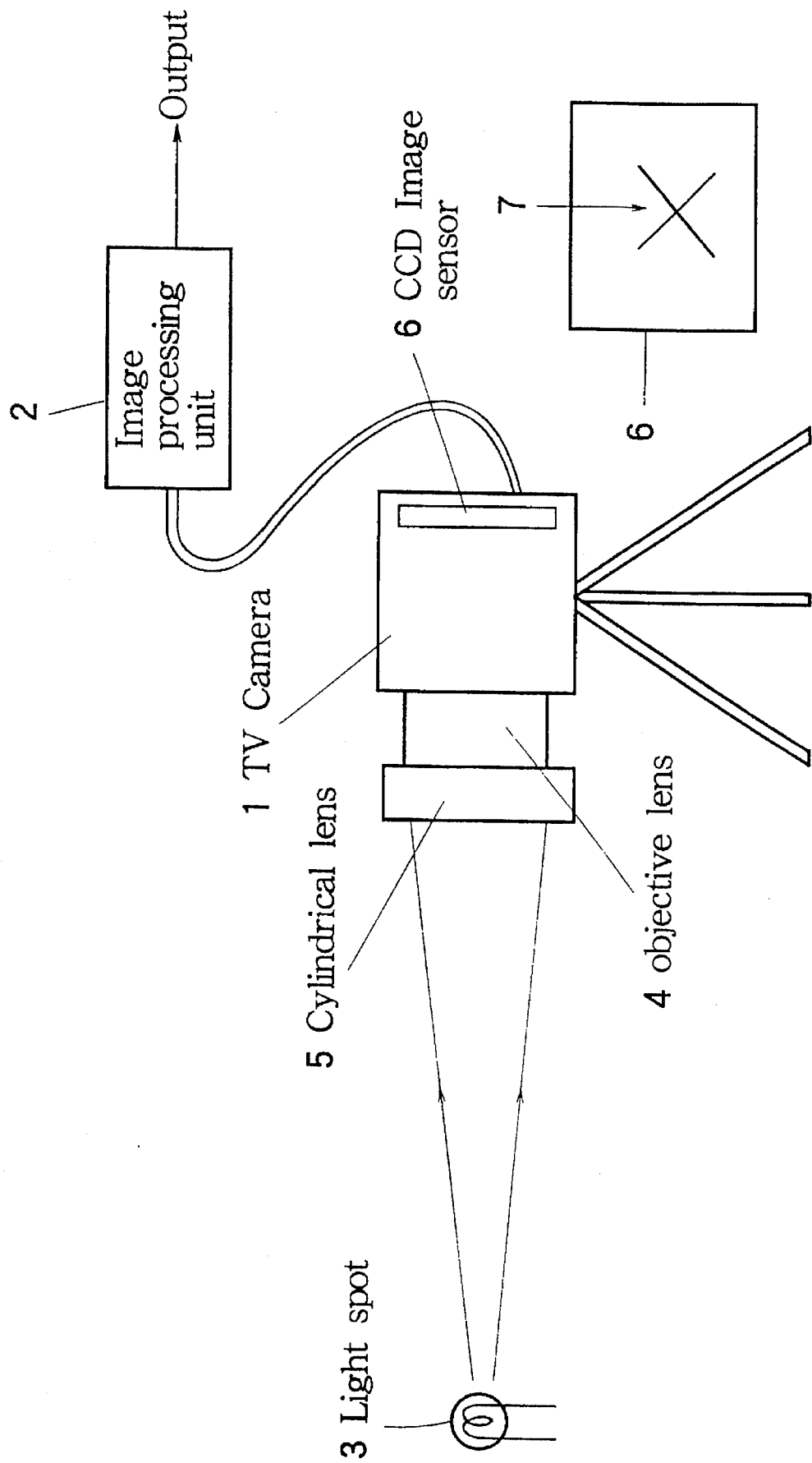
FIG. 1 is a diagram schematically showing a light spot position measuring apparatus according to a first preferred embodiment of the present invention.

FIG. 1 is a diagram showing a light spot position measuring apparatus according to a first preferred embodiment of the present invention. The apparatus includes a television camera 1 and an image processing unit 2 including, such as, a computer. The television camera 1 captures or picks up an image of a light spot 3 included in an object to be measured. The processing or computing unit 2 is connected to the television camera 1 and processes the captured image in the form of electric signals to output data indicative of a position of the light spot 3. A cylindrical lens 5 is mounted to an objective lens 4 of the television camera 1 to form optical conversion means. The cylindrical lens 5 has a plurality of cylindrical lens surfaces such that their respective cylinder axes, that is, center axes of cylinders defined by the respective cylindrical lens surfaces, intersect each other. In this preferred embodiment, the cylindrical lens 5 has a pair of cylindrical concave lens surfaces with their respective cylinder axes intersecting orthogonal to each other. The optical conversion means composed of the objective lens 4 and the cylindrical lens 5 collects and condenses a light emitted from the light spot 3 and converts the same into a plurality of linear images intersecting each other. In this preferred embodiment, the optical conversion means condenses and converts the light from the light spot 3 into a pair of linear images intersecting orthogonal to each other (hereinafter also referred to as a "cross-shaped linear image"). The television camera 1 includes image pickup means, such as, a CCD image sensor 6. The CCD image sensor 6 receives the cross-shaped linear image 7 converted by the optical conversion means and produces corresponding image data in the form of electric signals. The image processing unit 2 processes the image data and extracts a pair of straight lines from the cross-shaped linear image 7. The image processing unit 2 derives an intersection point between the extracted straight lines and determines a position of the light spot 3 in terms of the derived intersection point.

Figure 2:
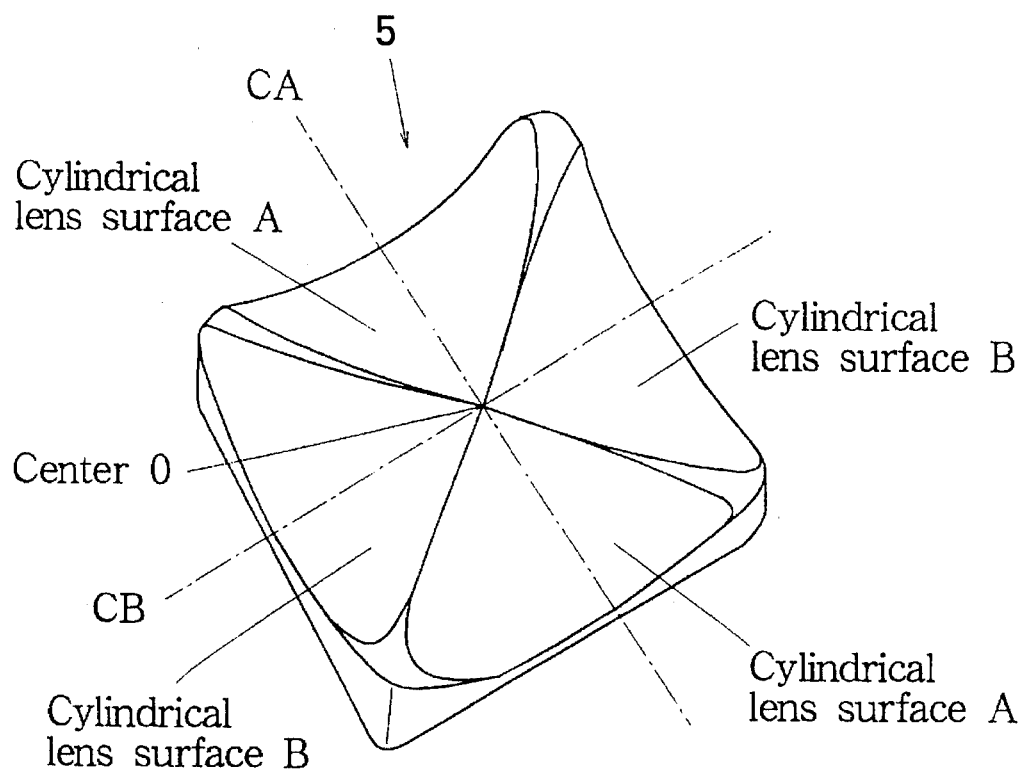
FIG. 2 is a perspective view showing a two-surface quarter-divided cylindrical concave lens incorporated in the light spot position measuring apparatus shown in FIG. 1.

FIG. 2 is a perspective view showing a configuration of the cylindrical lens 5 shown in FIG. 1. As described above, the cylindrical lens 5 has a pair of cylindrical lens surfaces A and B with their respective cylinder axes CA and CB intersecting orthogonal to each other. An intersection point between the cylinder axes CA and CB is located in an optical axis passing through a center O of the cylindrical lens 5. The cylindrical lens surface A is divided in half in symmetry with respect to the optical axis of the lens 5. Similarly, the cylindrical lens surface B is also divided in half in symmetry with respect to the optical axis of the lens 5. Accordingly, the cylindrical lens 5 has a surface configuration which is in point symmetry with respect to the center O.

Figure 3A:
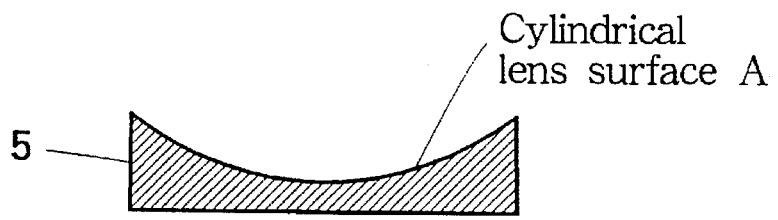
FIGS. 3A and 3B are diagrams, respectively, showing surface configurations of a pair of cylindrical lens surfaces of the cylindrical lens shown in FIG. 2.
Figure 3B:
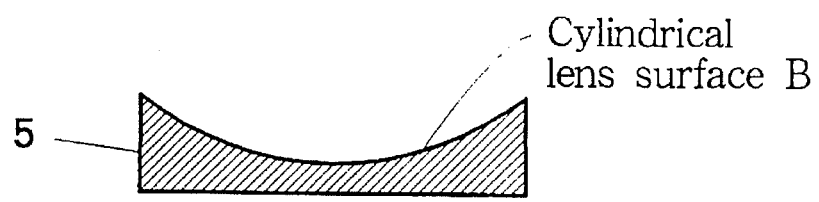

FIGS. 3A and 3B show surface configurations of the cylindrical lens surfaces A and B, respectively. As shown in FIG. 3A, when viewed in a direction of the cylinder axis CA, a concave configuration of the cylindrical lens surface A appears. Similarly, when viewed in a direction of the cylinder axis CB, another concave configuration of the cylindrical lens surface B appears. When the lens 5 having a pair of orthogonal cylindrical lens surfaces A and B is coupled to the objective lens 4, a light emitted from the light spot 3, which would otherwise be converged to a focal point by the objective lens 4, is divided into two light beams depending on passing areas on the surface of the cylindrical lens 5. The divided light beams pass through the orthogonal cylindrical lens surfaces A and B, respectively, so that, the cross-shaped linear image 7 is formed on an image pickup area of the CCD image sensor 6. This is because the light beams, which would otherwise be formed as a point image, are caused to diverge in directions orthogonal to the cylinder axes of the cylindrical lens surfaces A and B. Although the cylindrical lens surfaces A and B are concave in this preferred embodiment, the cylindrical lens surfaces may be convex in view of the foregoing diverging function of the cylindrical lens 5. As will be appreciated, by providing the cylindrical lens surfaces, a power of the light from the light spot 3 is uniformly dispersed or distributed to form linear images which are sharp against a background on the image pickup area of the CCD image sensor 6. Since the cylindrical lens 5 shown in FIG. 2 has a surface configuration which is in axial symmetry with respect to each of the cylinder axes CA and CB, the light power is uniformly dispersed in four directions to realize the cross-shaped linear image which is balanced in shape.

Figure 4A:
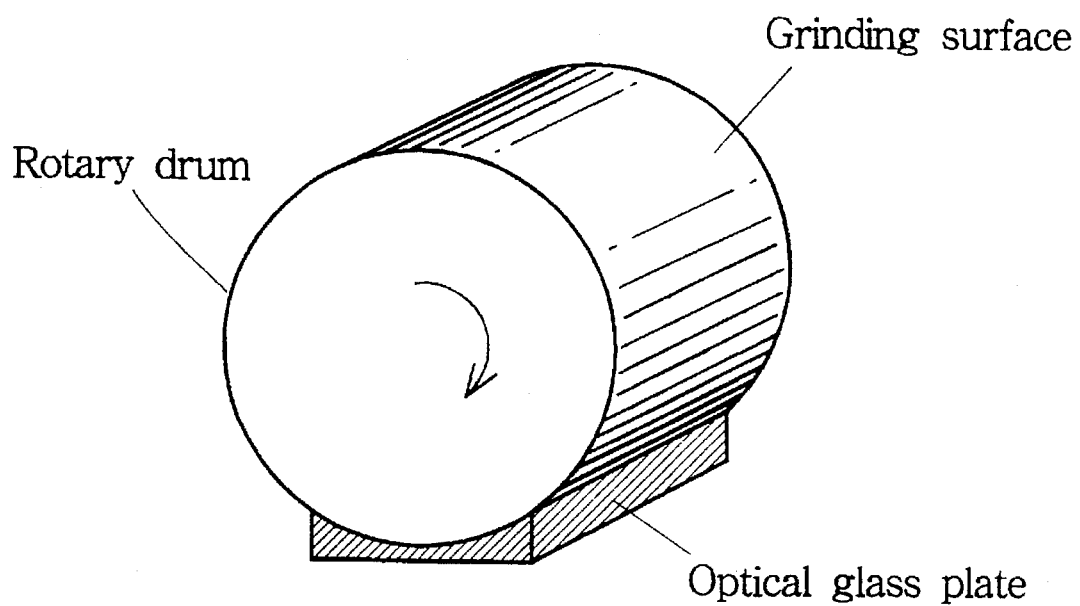
FIGS. 4A and 4B are diagrams, respectively, for explaining a method of manufacturing the cylindrical lens shown in FIG. 2.
Figure 4B:
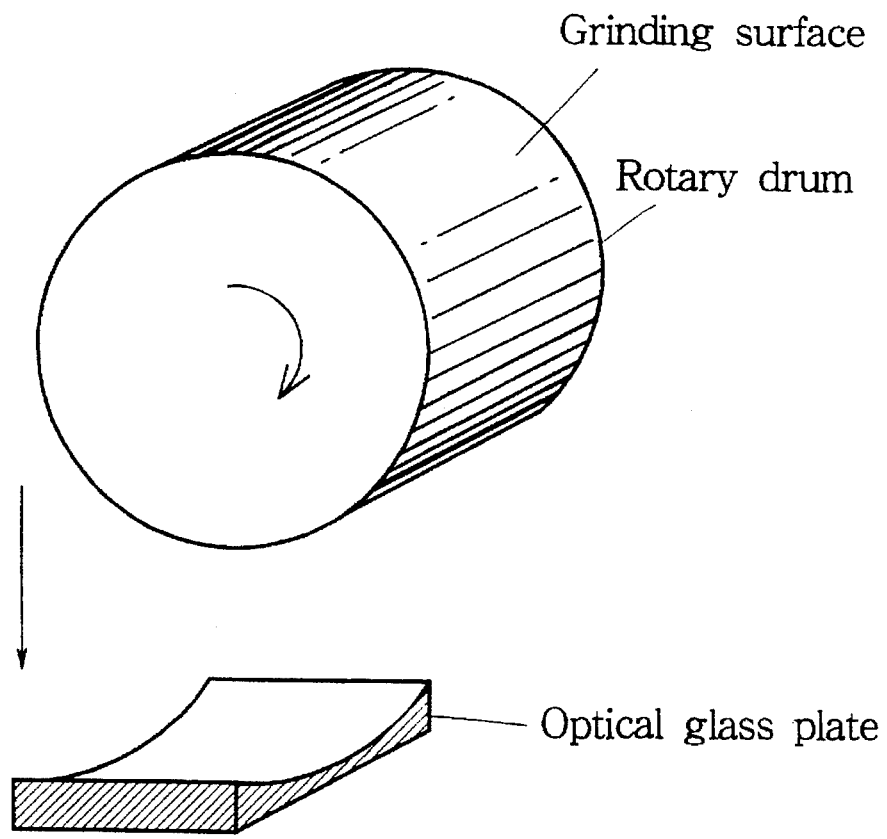

FIGS. 4A and 4B are diagrams, respectively, for explaining a method of manufacturing the cylindrical lens 5 shown in FIG. 2. As shown in FIG. 4A, a rotary drum having a grinding surface is pressed against a surface of an optical glass plate and rotated to grind the optical glass plate so as to form one of the cylindrical concave lens surfaces. Accordingly, the cylinder axis of the thus formed cylindrical lens surface coincides with a rotation axis of the rotary drum. Subsequently, as shown in FIG. 4B, the optical glass plate is turned by 90° and then ground by the rotary drum in the same manner so as to form the other of the cylindrical concave lens surfaces. As a result, the two-surface quarter-divided cylindrical concave lens 5 is produced by means of the grinding. Alternatively, the lens 5 may be produced by means of injection molding.

Figure 5A:
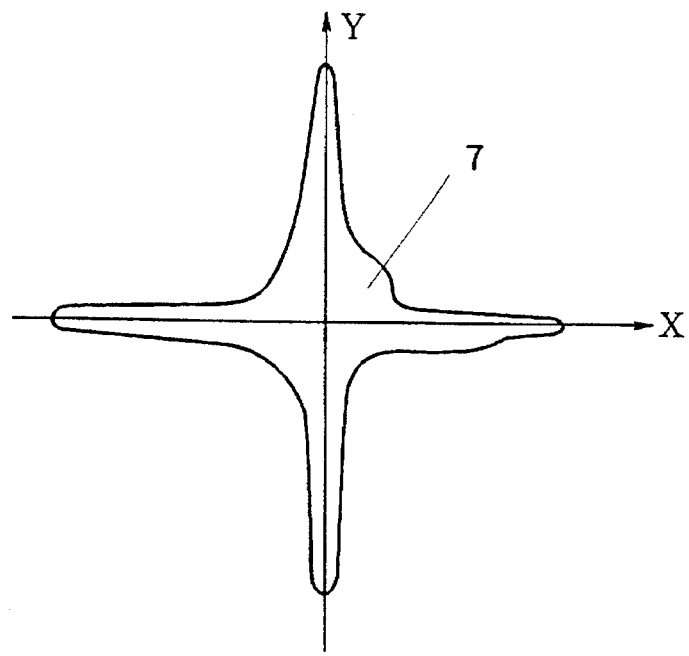
FIGS. 5A, 5B and 5C are diagrams, respectively, for explaining an image processing effected by an image processing unit shown in FIG. 1.
Figure 5B:
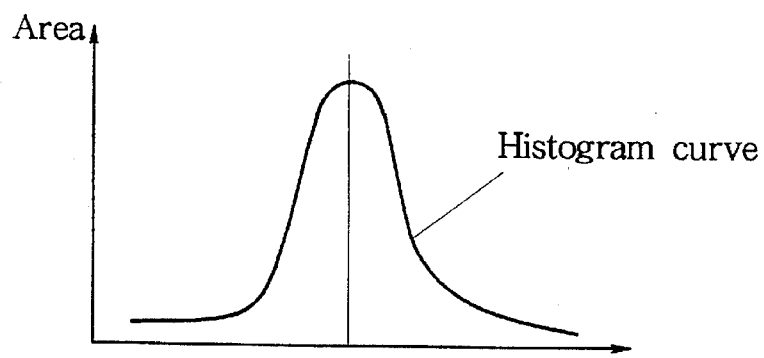
Figure 5C:
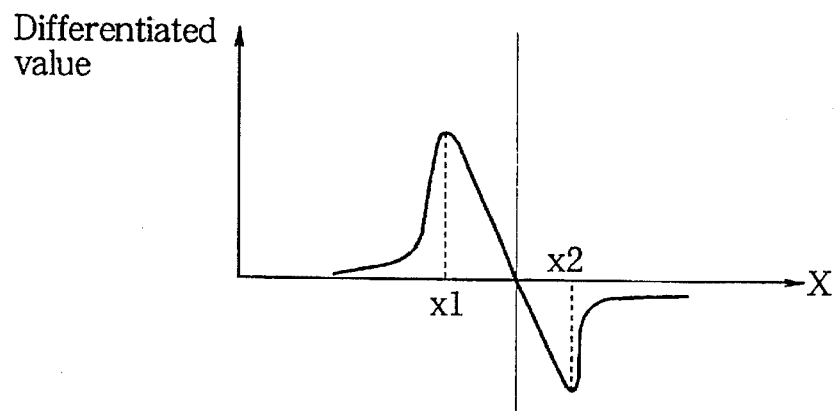

Now, one example of an image processing effected by the image processing unit 2 will be described in detail with reference to FIGS. 5A, 5B and 5C. As shown in FIG. 5A, an orthogonal coordinate system (X, Y) is set so as to match the cross-shaped linear image 7 projected onto the image pickup face of the CCD image sensor 6. Subsequently, as shown in FIG. 5B, a projection area of the cross-shaped linear image 7 is derived in an X-axis direction to obtain a histogram curve. Then, as shown in FIG. 5C, the histogram curve thus obtained is differentiated. Subsequently, X-coordinates x1 and x2 corresponding to maximal and minimal values are respectively derived. Then, by using the image data included in a band area defined between x1 and x2, linear-approximation is applied to the linear image in the Y-axis direction using the method of least squares to extract a corresponding straight line. Similarly, another straight line corresponding to the linear image along the X-axis direction is extracted using the method of least squares. An intersection point between the extracted straight lines is calculated so as to determine a position of the light spot 3.

Figure 6:
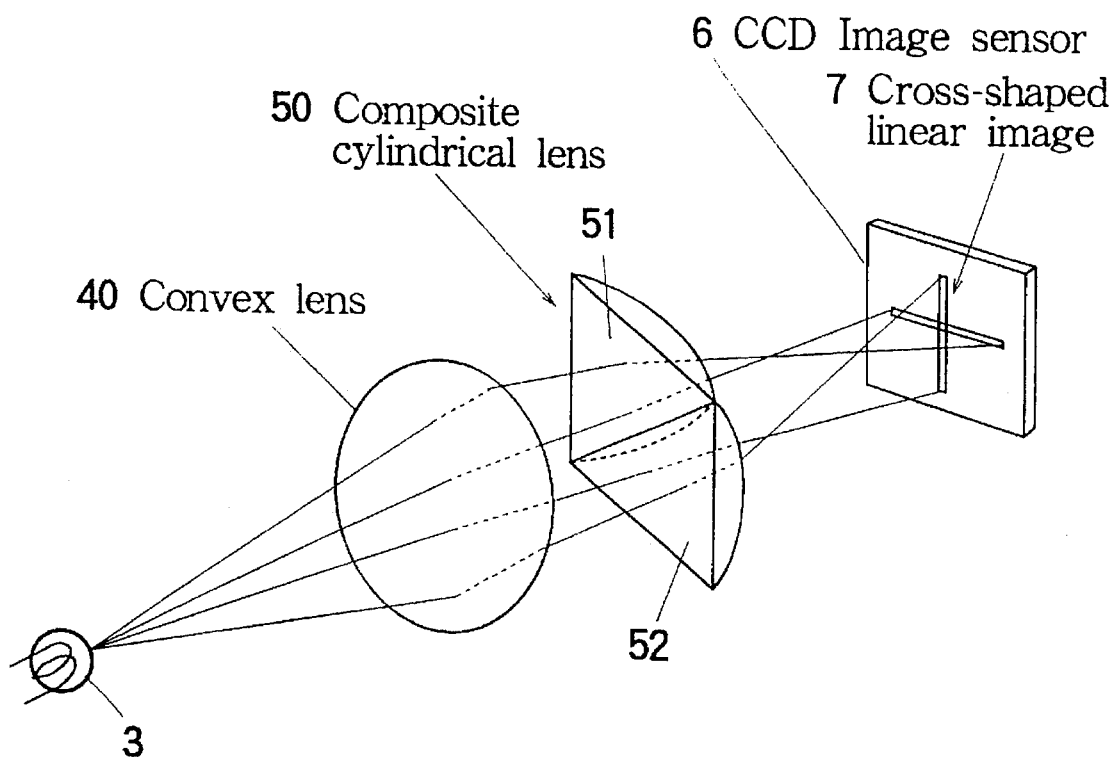
FIG. 6 is a diagram schematically showing a light spot position measuring apparatus according to a second preferred embodiment of the present invention.

FIG. 6 is a diagram schematically showing a light spot position measuring apparatus according to a second preferred embodiment of the present invention. As shown in FIG. 6, a convex lens 40 and a composite cylindrical lens 50 are interposed between the light spot 3 and the CCD image sensor 6 to form the optical conversion means. The convex lens 40 corresponds to the objective lens 4 shown in FIG. 1 and converges the light emitted from the light spot 3 onto the image pickup area of the CCD image sensor 6. The composite or compound cylindrical lens 50 is formed by an essentially triangular cylindrical convex lenses 51 and 52 which are attached to each other. The cylindrical convex lens 51 has a cylinder axis extending vertically. The cylindrical convex lens 51 allows half of the converged light from the convex lens 40 to pass therethrough and to diverge horizontally. The other cylindrical convex lens 52 has a cylinder axis extending horizontally. The cylindrical convex lens 52 allows the remaining half of the converged light to pass therethrough and to diverge vertically. This causes the cross-shaped linear image 7 to be projected onto the image pickup area of the CCD image sensor 6. The compound cylindrical lens 50 used in this preferred embodiment is not in point Symmetry as opposed to the two-surface quarter-divided cylindrical concave lens 5 shown in FIG. 2; however, the lens 50 can be produced relatively easily.

Figure 7:
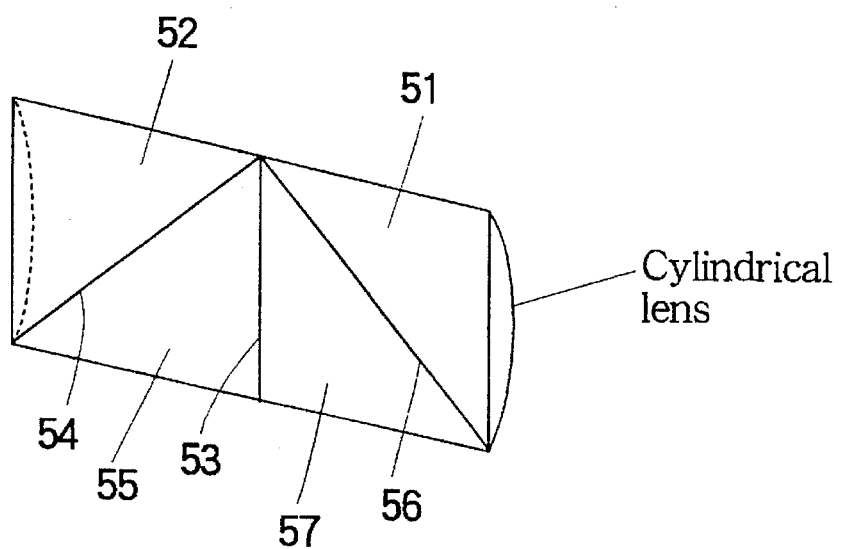
FIG. 7 is a diagram for explaining one example of producing a composite cylindrical lens shown in FIG. 6.

FIG. 7 is a diagram for explaining one example of producing the compound cylindrical lens 50 shown in FIG. 6. In FIG. 7, an elongate rectangular cylindrical convex lens is first cut along a cut line 53 which is perpendicular to a cylinder axis of the lens. One of the cut lenses is further cut along a diagonal cut line 54 to obtain triangular cylindrical lenses 52 and 55. The other of the cut lenses is also further cut along a diagonal cut line 56 to obtain triangular cylindrical lenses 51 and 57. As will be appreciated, the compound cylindrical lens 50 is obtained by attaching the cylindrical lenses 51 and 52 to each other via the above-described cut surfaces thereof.

Figure 8:
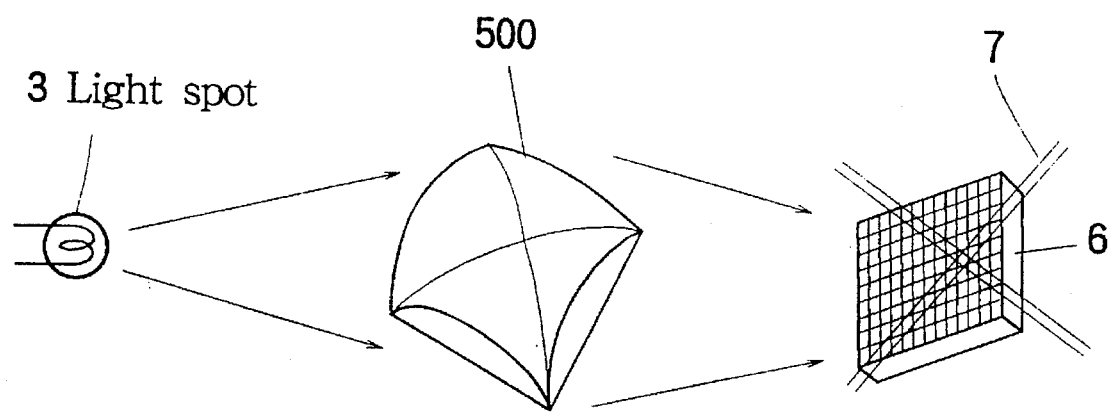
FIG. 8 is a diagram schematically showing a light spot position measuring apparatus according to a third preferred embodiment of the present invention.

FIG. 8 is a diagram schematically showing a light spot position measuring apparatus according to a third preferred embodiment of the present invention. As shown in FIG. 8, a two-surface quarter-divided cylindrical convex lens 500 is interposed between the light spot 3 and the CCD image sensor 6. The cylindrical convex lens 500 also works as an objective lens so that the optical conversion means is formed solely by the cylindrical convex lens 500. When using a lens having two cylindrical lens surfaces as an objective lens, it is necessary that each of the cylindrical lens surfaces are convex. Cross sections orthogonal to cylinder axes of the cylindrical convex lens surfaces each have the same function as a spherical convex lens so that the image of the light spot 3 is converged according to the lens formula. On the other hand, a section along the cylinder axis of either of the cylindrical convex lens surfaces is rectangular and thus does not work to converge the light from the light spot. This means that the cylindrical convex lens can alone convert the light spot into linear images to be projected without using the spherical convex lens. In the two-surface quarter-divided cylindrical convex lens 500 having a pair of cylindrical convex lens surfaces with their cylinder axes orthogonal to each other, the light advancing along the optical axis is divided into two light beams depending on passing areas, and the divided light beams are projected as a pair of the linear images orthogonal to each other, that is, the cross-shaped linear image 7. In general, the lens of this type can produce a desired number of the linear images extending in desired directions depending on the member of the divided surfaces and the number of cylindrical convex lenses assigned to each of the divided surfaces.

Figure 9:
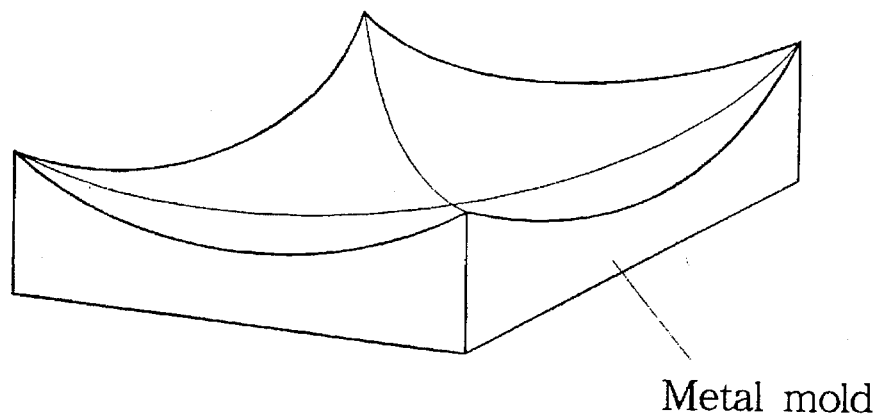
FIG. 9 is a diagram for explaining one example of producing a two-surface quarter-divided cylindrical convex lens shown in FIG. 8.

With reference to FIG. 9, one example of producing the two-surface quarter-divided cylindrical convex lens 500 shown in FIG. 8 will be explained. In this example, a metal mold is used for producing the cylindrical convex lens 500. The metal mold is formed by carrying out the same processing as shown in FIGS. 4A and 4B, that is, by applying the orthogonal grinding using the rotary drum. Alternatively, the two-surface quarter-divided cylindrical convex lens 500 may be directly formed by grinding without using the metal mold.

Figure 10:
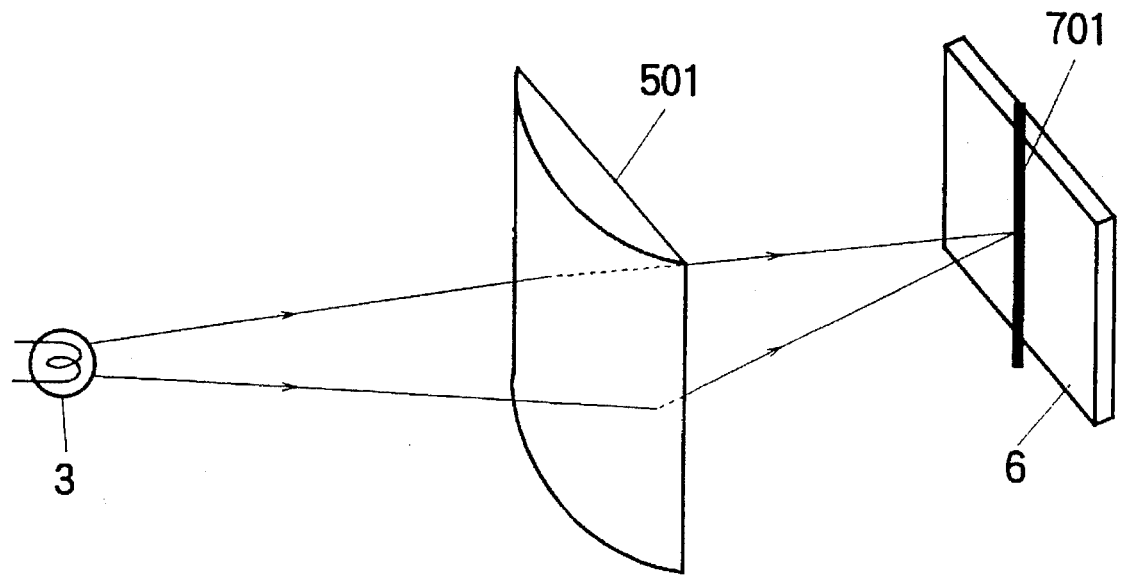
FIG. 10 is a diagram for explaining an operation of a cylindrical convex lens which also functions as an objective lens.

FIG. 10 is a diagram for explaining an operation of a cylindrical convex lens which also works as an objective lens. A cross section orthogonal to a cylinder axis of the cylindrical convex lens 501 has a convex shape so that the light emitted from the light spot 3 is converged according to the lens formula. On the other hand, a section along the cylinder axis of the cylindrical convex lens 501 is rectangular and thus does not converge the light. As a result, a linear image 701 parallel to the cylinder axis is projected onto the image pickup face of the CCD image sensor 6.

Figure 11:
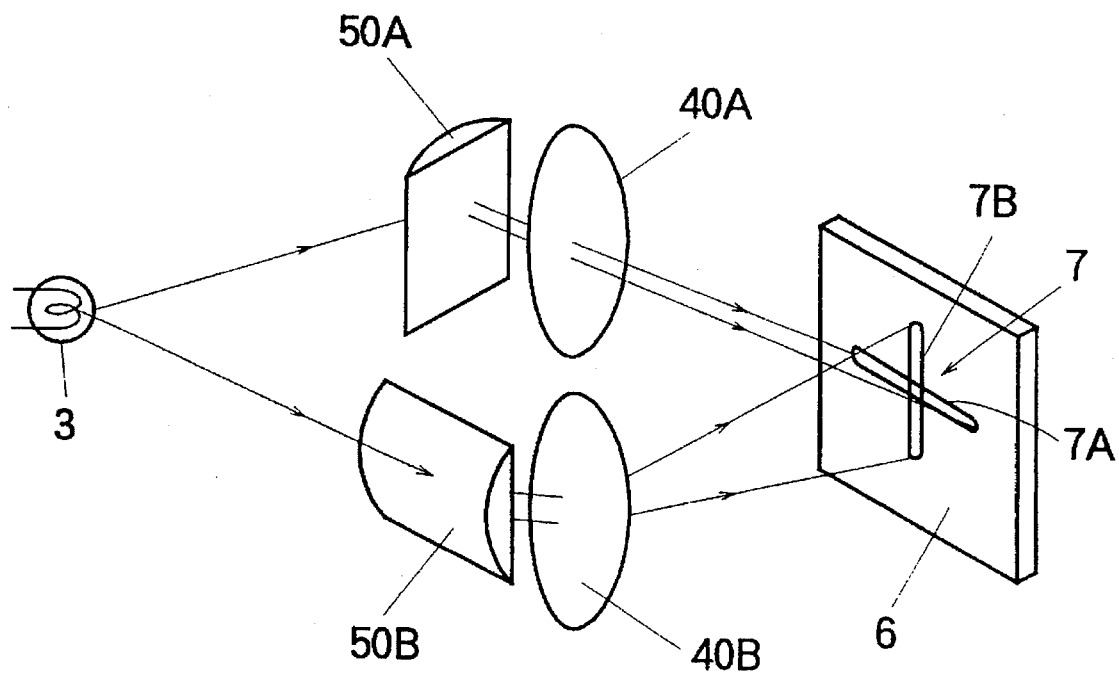
FIG. 11 is a diagram schematically showing a light spot measuring apparatus according to a fourth preferred embodiment of the present invention.

FIG. 11 is a diagram schematically showing a light spot position measuring apparatus according to a fourth preferred embodiment of the present invention. In the foregoing first to third preferred embodiments, a single lens is used which has orthogonal cylindrical lens surfaces thereon. On the other hand, in this preferred embodiment, a pair of separate cylindrical convex lenses are used to form the cross-shaped linear image 7 in a composite manner. As shown in FIG. 11, the light emitted from the light spot 3 is separated into two light beams by a half mirror or a beam splitter (not shown). In one of light paths, a cylindrical convex lens 50A and an objective lens 40A forming together the optical conversion means are arranged. The cylindrical lens 50A has a vertical cylinder axis and projects a horizontal linear image 7A onto the image pickup face of the CCD image sensor 6. Similarly, in the other of the light paths, a cylindrical convex lens 50B and an objective lens 40B forming together the optical conversion means are arranged. The cylindrical lens 50B has a horizontal cylinder axis and projects a vertical linear image 7B onto the image pickup surface of the CCD image sensor 6. The linear images 7A and 7B orthogonal to each other are synthesized via an optical system (not shown) into the cross-shaped linear image 7.

FIGS. 12A and 12B are diagrams, respectively, for explaining an operation of the optical conversion means formed by the cylindrical lens 50A and the objective lens 40A shown in FIG. 11. FIG. 12A is a horizontal geometric optical view along a plane orthogonal to the cylinder axis of the cylindrical convex lens 50A. Similarly, FIG. 12B is a vertical geometric optical view along another plane parallel to the cylinder axis of the cylindrical convex lens 50A. As shown in FIG. 12A, assuming that the cylindrical lens 50A is not provided, the light beam emitted from the light spot 3 along the optical axis is condensed by the objective lens 40A and is focused on the image pickup face of the CCD image sensor 6 as a point. On the other hand, when the cylindrical lens 50A is provided, the incident beam is refracted along the concave surface so as to be defocused and projected onto the image pickup face of the CCD image sensor 6 as the horizontal linear image 7A. Referring to FIG. 12B, since the vertical section of the cylindrical lens 50A is of a simple plate-like shape, no refraction is caused so that the light beam incident along the vertical section is converged to a point by the objective lens 40A.

As will be appreciated, according to the foregoing preferred embodiments, at least two cylindrical lens surfaces are used in addition to or without the objective lens. With this arrangement, the light spot is converted into the sharp cross-shaped linear image so that the light power can be uniformly dispersed. Accordingly, even if the light emitted from the light spot is weak, since the light power is efficiently utilized, the light spot position can be reliably measured with high accuracy. This makes it possible that, in the measuring system of, such as, the surface configuration of the three-dimensional object where the object is spot-scanned by the laser beam, an allowable measurement distance can be extended and a lack in sensitivity caused by fast laser-beam scanning can be compensated.

It is to be understood that this invention is not to be limited to the preferred embodiments and modifications described above, and that various changes and modifications may be made without departing from the spirit and scope of the invention as defined in the appended claims.

What is claimed is:

1. A light spot position measuring apparatus comprising:
   optical conversion means for converting an incident light into a plurality of linear images intersecting each other;
   image pickup means for receiving the linear images and producing corresponding image data; and
   image processing means for processing the image data to derive a plurality of straight lines corresponding to the linear images and for deriving an intersection point of the straight lines to determine a position of a light spot from which the incident light emanates;
   wherein said optical conversion means includes a plurality of cylindrical lens surfaces having cylinder axes intersecting each other so as to form said linear images.

2. A light spot measuring apparatus as set forth in claim 1; wherein the plurality of cylindrical lens surfaces comprises two cylindrical lens surfaces having cylinder axes intersecting orthogonal to each other, so as to form cross-shaped linear images.

3. A light spot position measuring apparatus as set forth in claim 2; wherein said cylindrical lens surfaces are formed on a single lens and wherein each of said cylindrical lens surfaces is divided in symmetry with respect to an optical axis of the lens.

4. A light spot position measuring method comprising:
   a conversion step for converting an incident light into a plurality of linear images intersecting each other using optical conversion means having a plurality of cylindrical lens surfaces having cylinder axes intersecting each other;
   an image pickup step for receiving said linear images and producing corresponding image data; and
   a deriving step for processing said image data to derive a plurality of intersecting straight lines corresponding to the plurality of intersecting linear images and deriving an intersection point thereof so as to determine a position of a light spot from which the incident light emanates.

5. A light spot position measuring method as set forth in claim 4; wherein the optical conversion means used in the conversion step comprises a pair of cylindrical lens surfaces having cylinder axes intersecting orthogonal to each other so as to form cross-shaped linear images.

6. A light spot position measuring apparatus according to claim 1; wherein the optical conversion means converts incident light which emanates from a light spot included in an image of an object to be measured.

7. A light spot position measuring method according to claim 4; wherein the conversion step includes converting incident light that emanates from a light spot included in an image of an object to be measured.

8. A light spot position measuring method using an optical converter which converts a light spot of an object to be measured into a plurality of linear images each extending substantially in one direction, using a two-dimensional image pick-up device which captures the linear images and produces corresponding image data, and using an image processing unit which processes the image data to derive a position of the light spot, the method comprising:
   projecting the light spot onto the optical converter to convert the light spot into a plurality of linear images each extending substantially in the predetermined one-dimensional direction;
   projecting the linear images onto the two-dimensional image pick-up device;
   performing linear-approximation on the image data corresponding to the linear images to derive a plurality of corresponding straight lines; and determining the position of the light spot based on a point of intersection of the straight lines.

9. A light spot position measuring method according to claim 8; wherein the step of projecting the linear images includes the step of projecting the linear images using an optical converter having a plurality of intersecting cylindrical lens surfaces.

10. A method for determining the position of a light spot, comprising the steps of:

converting a light spot into a plurality of intersecting linear images using an optical converter;

providing an image pick-up device having a two-dimensional pixel array for receiving an image and producing corresponding image data;

setting up an orthogonal coordinate system relative to the pixel array, the coordinate system having a main axis and an auxiliary axis orthogonal thereto;

projecting the intersecting linear images onto the pixel array; and processing the image data output by the image pick-up device in response to the projected linear image to perform linear approximation to determine a plurality of intersecting straight lines corresponding to the intersecting linear images and determining the location of the light spot by determining the point of intersection of the plural intersecting straight lines.

11. A method for determining the position of a light spot according to claim 10; wherein the optical converter includes a plurality of intersecting cylindrical lens surfaces.

12. A method for determining the position of a light spot according to claim 10; wherein the optical converter includes a plurality of cylindrical lenses having intersecting cylinder axes.

13. A method for determining the position of a light spot according to claim 10; wherein the step of projecting the intersecting linear images is performed using an optical converter having symmetrically divided cylindrical lens surfaces, the cylindrical lens surfaces having cylinder axes which are orthogonal to each other.

14. An apparatus for determining the position of a light spot, comprising: an optical converter for converting a light spot into a plurality of intersecting linear images and projecting the linear images; an image pick-up device for receiving the projected linear images and producing corresponding image data; and image processing means for processing the image data by performing a linear-approximation of the linear image to derive a plurality of intersecting straight lines corresponding to the intersecting linear images and for determining the location of the light spot in accordance with a point of intersection of the straight lines.

* * * * *